United States Patent
Lin et al.

(10) Patent No.: US 8,311,091 B1
(45) Date of Patent: Nov. 13, 2012

(54) CACHE OPTIMIZATION FOR VIDEO CODECS AND VIDEO FILTERS OR COLOR CONVERTERS

(75) Inventors: Chin-Yee Lin, Los Gatos, CA (US); Yang Cai, San Jose, CA (US)

(73) Assignee: VisualOn, Inc., Santa Clara, CA (US)

( * ) Notice: Subject to any disclaimer, the term of this patent is extended or adjusted under 35 U.S.C. 154(b) by 1508 days.

(21) Appl. No.: 11/445,449

(22) Filed: May 31, 2006

Related U.S. Application Data

(60) Provisional application No. 60/687,170, filed on Jun. 3, 2005.

(51) Int. Cl.
*H04N 7/12* (2006.01)
*G06F 9/46* (2006.01)

(52) U.S. Cl. .................................. 375/240.01; 718/101

(58) Field of Classification Search ............. 375/240.01, 375/261; 707/101, 204, 3; 386/46; 719/328; 382/426.09, 240; 718/101
See application file for complete search history.

(56) References Cited

U.S. PATENT DOCUMENTS

| | | | |
|---|---|---|---|
| 4,774,587 A * | 9/1988 | Schmitt .................... | 358/426.09 |
| 5,307,377 A * | 4/1994 | Chouly et al. ................ | 375/261 |
| 7,007,031 B2 * | 2/2006 | MacInnis et al. ............. | 707/101 |
| 7,516,459 B2 * | 4/2009 | Nagendra et al. ............. | 719/328 |
| 2001/0041015 A1 * | 11/2001 | Chui .............................. | 382/240 |
| 2002/0091722 A1 * | 7/2002 | Gupta et al. .................. | 707/204 |
| 2002/0154889 A1 * | 10/2002 | Jeon et al. ....................... | 386/46 |
| 2003/0191752 A1 * | 10/2003 | Fairweather ...................... | 707/3 |

\* cited by examiner

*Primary Examiner* — Gims Philippe
(74) *Attorney, Agent, or Firm* — Van Pelt, Yi & James LLP

(57) ABSTRACT

Cache usage optimization is disclosed. At runtime, a number of blocks of video data to be processed as a batch is determined based at least in part on a performance metric. A group of blocks that includes the determined number of blocks is processed as a batch.

19 Claims, 10 Drawing Sheets

| Number of Blocks | Processing Performance Metric Value |
|---|---|
| 1 | Value 1 |
| 2 | Value 2 |
| 3 | Value 3 |
| 4 | Value 4 |
| 5 | Value 5 |
| 6 | Value 6 |
| ⋮ | ⋮ |
| N | Value N |

FIG. 8

CACHE OPTIMIZATION FOR VIDEO CODECS AND VIDEO FILTERS OR COLOR CONVERTERS

CROSS REFERENCE TO OTHER APPLICATIONS

This application claims priority to U.S. Provisional Patent Application No. 60/687,170 entitled IN-PLACE DEBLOCKING FILTER filed Jun. 3, 2005 which is incorporated herein by reference for all purposes.

BACKGROUND OF THE INVENTION

A typical microprocessor used in video processing has internal memory that is designed to be used for caching data and caching instructions. When a program starts to execute on the microprocessor, all data and instruction are stored in external memory (e.g., random access memory (RAM)). The internal memory stores recent data and instructions that are used in the course of executing the program and which are retrieved from the external memory. If the same data and/or instructions are required again during the execution of the program, the processor can quickly access the internal memory, or cache, to get the information, if it is still present in the cache (i.e., has not been overwritten by other, e.g., more recently used data). Since the size of the cache is small, the processor will automatically replace old data and/or instructions in the cache with more recent ones according to the microprocessor's built-in cache management algorithms. During the execution of a program, if there are data and/or instructions required for execution of the program that are not currently in the cache, a cache miss occurs where the microprocessor has to access the external memory to retrieve the necessary data and/or instructions. As a result, program execution is slowed because of the added time required to retrieve the data and/or instructions from the external memory; the added amount of time required to access data and/or instructions external to the cache is referred to as a cache miss penalty.

Video decoding and filtering involves large amounts of data and complex processing. Simple strategies for processing video are not optimal in terms of processing speed and/or cache usage. For example, decoding an entire video frame before filtering the same frame can lead to a large number of data cache misses because an entire video frame does not fit in the cache, and therefore parts of the video frame data need to be swapped in and out of the cache for each processing step. It would be beneficial to be able to make cache utilization as efficient as possible in order to reduce cache miss penalties.

BRIEF DESCRIPTION OF THE DRAWINGS

Various embodiments of the invention are disclosed in the following detailed description and the accompanying drawings.

FIG. 8 illustrates a table of processing performance metric values in one embodiment.

DETAILED DESCRIPTION

Figure 1:
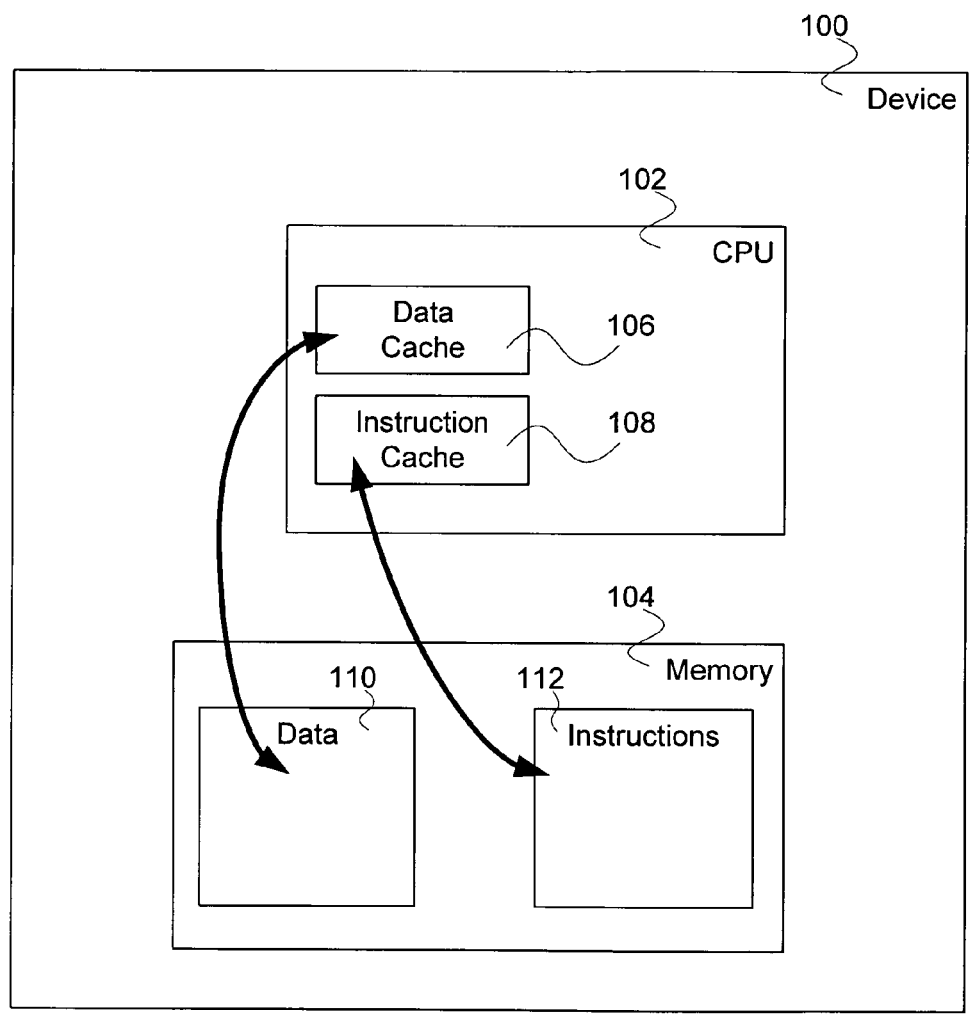
FIG. 1 is a block diagram illustrating an embodiment of a system for video processing.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Cache usage optimization is disclosed. At runtime, a number of blocks, or macroblocks, of video data to be processed as a batch is determined based at least in part on a performance metric. A group of blocks that includes the determined number of blocks is processed as a batch. In some embodiments, a number of macroblocks of a video frame are processed as a group of data through one or more video processing steps. The performance metric measures how quickly or efficiently the video processing occurs, e.g., in terms of processing time, CPU cycles, etc. The number of blocks to process as a batch is selected in an effort to make the video processing as quick and/or as efficient as possible. The selection of the number of blocks can affect the number of cache misses during processing because if the size of the batch of data to be processed fits appropriately in the cache, there will likely not be a cache miss that occurs because of a need to retrieve data not already in the cache during processing. Optimizing based on a performance metric is believed to optimize use of both the data cache and the instruction cache, and allows optimization without a priori knowledge of the decoder and/or decoding system characteristics. In some embodiments, a table is used to keep track of performance metric values achieved for batches including various different numbers of blocks (e.g., the average time for processing per block for a given number of blocks processed as a batch). The table can be initialized by processing for each candidate number of blocks at least one batch of blocks comprising that number of blocks, e.g., at least once at the start of video processing, and recording in the table the processing performance metric value achieved for each. In some embodiments, after each batch of a number of blocks is processed, the number of blocks to be processed next is determined based on the measured processing performance metric values. For example, in some embodiments, a value for the performance metric achieved in processing the most recently processed batch of blocks is compared against a table such as described above to verify that the result achieved is better than the respective values recorded previously for other batch sizes. In some embodiments, if another batch size achieved a better result than the long term average achieved using the most recently used batch size, the other batch size is used in the next iteration. In various embodiments, the measured processing performance metric values are averaged over a period of time, over all time, are not averaged (e.g., only the most recent value of the performance processing metric for a given number of blocks processed as a batch are used), or any other appropriate weighting of values for the processing metric.

In some embodiments, a block of data comprising less than a frame of video data is selected for video processing. The block of data is decoded. The post decoding processing is performed with respect to the decoded block of data without first waiting to complete decoding of one or more other blocks comprising the frame of video. By performing multiple processing steps on less than a frame of video data, the block of data can be maintained in the data cache while the processing steps are performed allowing a performance improvement for processing because data cache misses are reduced.

In some embodiments, determining the multiple processing steps for the video processing, can reduce the number of instruction cache misses—for example, the processing steps that are performed on the blocks of data are selected so that the size of processing step's instruction is smaller than the instruction cache size. By performing multiple processing steps with instruction size less than the cache size on a block of data, a performance improvement is achieved for processing because instruction cache misses are reduced.

FIG. 1 is a block diagram illustrating an embodiment of a system for video processing. In the example shown, device 100 includes central processing unit (CPU) 102 and memory 104. In some embodiments, device 100 processes a stream of video comprised of video frames using CPU 102 and memory 104. CPU 102 includes data cache 106 and instruction cache 108. Both data cache 106 and instruction cache 108 comprise internal memory for CPU 102 that are used during execution of a program. Data cache 104 stores data for fast access during the execution of instructions by CPU 102. Instruction cache 108 holds instructions for CPU 102 that are executed during the running of a program. In some embodiments, data cache 106 and instruction cache 108 are combined into a single cache. Memory 104 can have data 110 and instructions 112 stored within it. In some embodiments, during video processing data 110 and instructions 112 are transferred in and out of data cache 106 and instruction cache 108, respectively, as requested by CPU 102. In various embodiments, device 100 comprises a device capable of displaying video streams—for example, a personal digital assistant (PDA), a cell phone, a portable video player, a portable media player, or any other appropriate video player.

Figure 2:
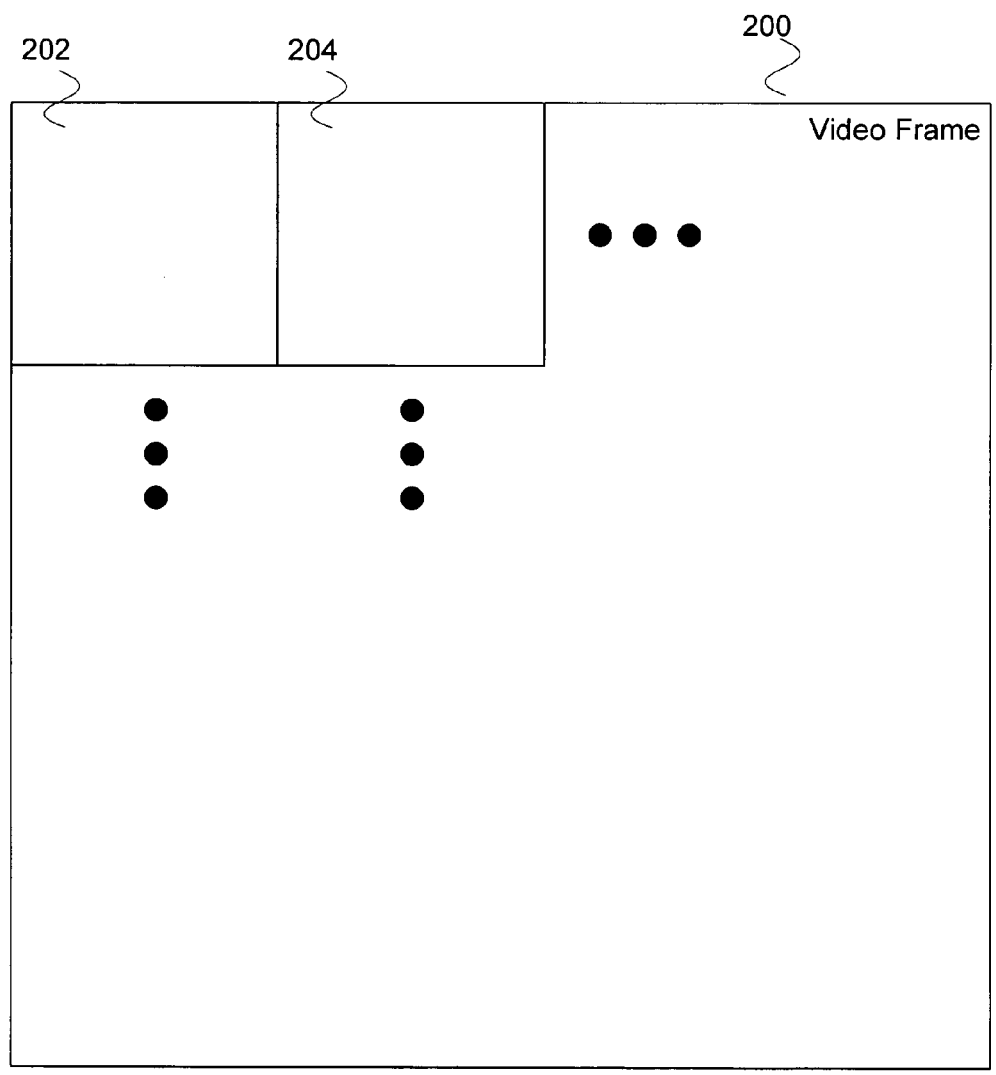
FIG. 2 is a block diagram illustrating video frame organization in one embodiment.

FIG. 2 is a block diagram illustrating video frame organization in one embodiment. In some embodiments, video frame 200 of FIG. 2 is processed by device 100 of FIG. 1 using CPU 102 and memory 104. In the example shown, video frame 200 includes a plurality of macroblocks that comprise the basic unit encoded/decoded in a frame, represented in FIG. 2 by macroblock 202 and macroblock 204. In some embodiments, a macroblock comprises, e.g., a 16×16 pixel square of video frame data. In various embodiments, video frame 200 comprises a frame of data that is encoded or decoded using MPEG-2 (a standard for compression of audio and video data agreed upon by the motion pictures experts group), MPEG-4 (also a standard for compression of audio and video data agreed upon by the motion pictures experts group), H.264 (a standard for very high data compression of audio and video data agreed upon by the motion pictures experts group and the video coding experts group), or any other appropriate block based video standard.

Figure 3A:
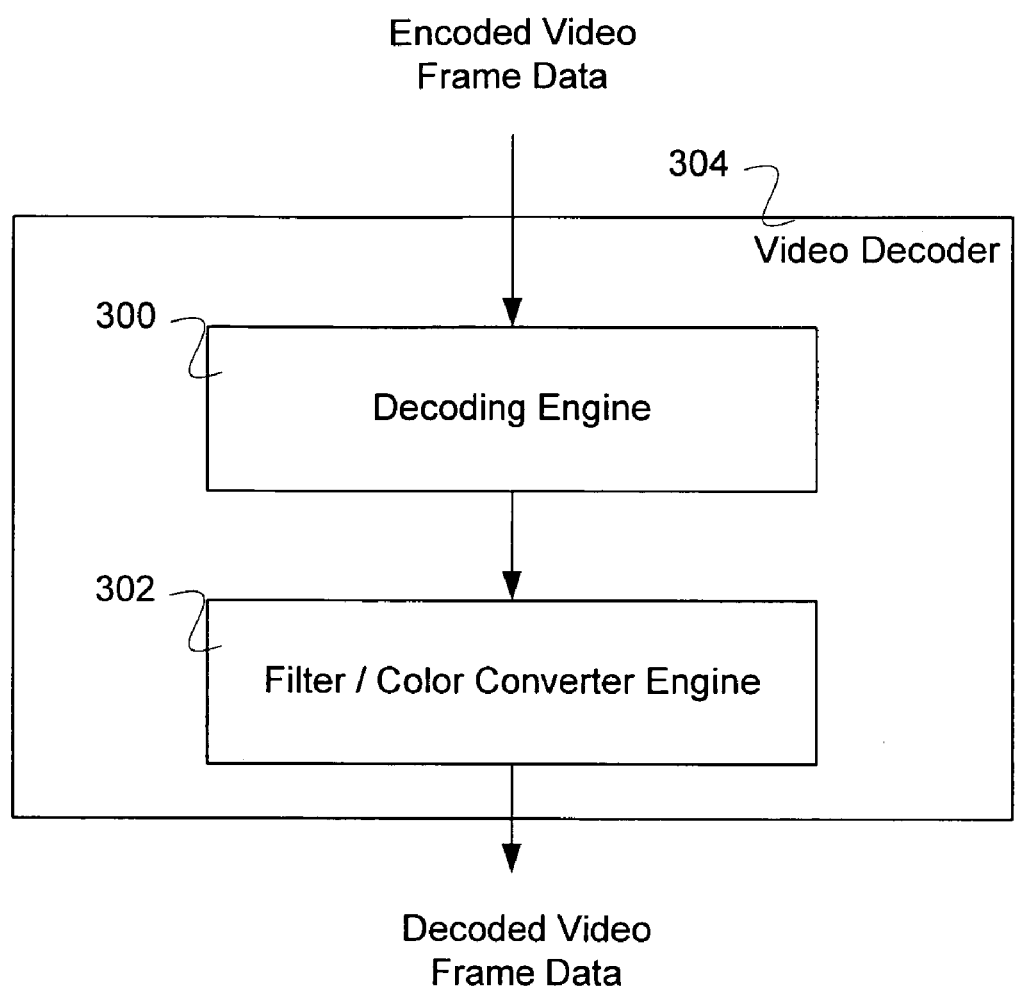
FIG. 3A is a block diagram illustrating an embodiment of a video decoder.

FIG. 3A is a block diagram illustrating an embodiment of a video decoder. In some embodiments, video decoder 304 is implemented as a program that executes on CPU 102 of device 100 of FIG. 1. In the example shown, encoded video frame data is input to video decoder 304. Video decoder 304 processes the input encoded video frame data and outputs decoded video frame data. Video decoder 304 includes decoding engine 300 and filter/color converter engine 302. Decoding engine 304 is capable of decoding a macroblock of video data. In some embodiments, decoding engine 304 includes processes to read in compressed data, decompress the data, and output uncompressed data. Filter/color converter engine 302 is capable of performing image filtering or color conversion on macroblocks of video data. Image filtering includes all possible image processing filtering, such as deinterlacing filtering, deringing filtering, and deblocking filtering (e.g., in-loop H.264 deblocking filtering in both decoder and encoder). Color conversion includes all possible color space conversion engines. In various embodiments, video decoder 300 is capable of decoding MPEG-2 encoded video streams, MPEG-4 encoded video streams, H.264 encoded video streams, or any other appropriate block based encoded video streams. In some embodiments, video decoder 300 processing process is comprised of a different number of subunits or of a different partitioning of subunits of processing than as depicted in FIG. 3A. In some embodiments, the number of subunits and/or the partitioning of subunits of processing are selected to attempt to reduce the execution time of video decoder 300 by reducing the number of instruction cache misses—for example, if the video processing processes can be broken into subunits that can separately operate on data blocks and these subunits can fit in the instruction cache, then the number of cache misses may be reduced for both data cache misses and instruction cache misses. In some embodiments, the partitioning of subunits of processing is based on a design time choice and is not adaptable to runtime variations that arise from different hardware configurations or performances.

Figure 3B:
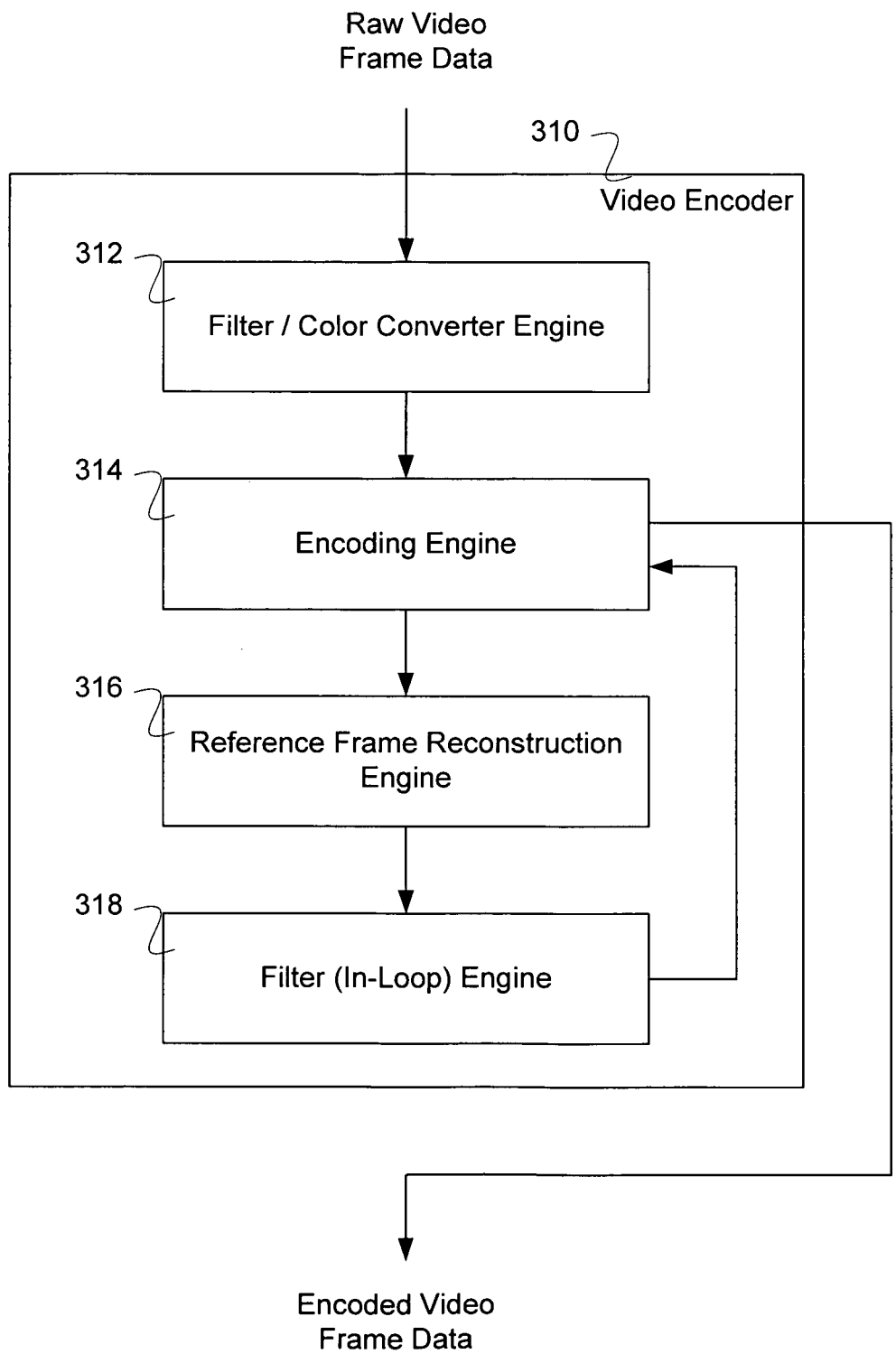
FIG. 3B is a block diagram illustrating an embodiment of a video encoder.

FIG. 3B is a block diagram illustrating an embodiment of a video encoder. In some embodiments, video encoder 310 is implemented as a program that executes on CPU 102 of device 100 of FIG. 1. In the example shown, raw video frame data is input to video encoder 310. Video encoder 310 processes the input raw video frame data and outputs encoded video frame data. Video encoder 310 includes filter/color converter engine 312, encoding engine 314, reference frame reconstruction engine 316, and filter (in-loop) engine 318. Filter/color converter engine 312 is capable of performing image filtering or color conversion on macroblocks of video data. Image filtering includes all possible image processing filtering, such as deinterlacing filtering, deringing filtering, and deblocking filtering. Color conversion includes all possible color space conversion engines. Encoding engine 314 is capable of encoding a macroblock of video data. In some embodiments, encoding engine 314 includes processes to read in raw data, compress the data, encode data, and output encoded data. Reference frame reconstruction engine 316 includes processing of the encoded macroblocks to be able to reconstruct an unfiltered reference frame from the encoded video stream. Filter (in-loop) engine 318 completes the processing of the reference frame so that the filtered reference frame can be used as an input to encoding engine 314—for example, as a reference for motion estimation during encoding. In-loop filtering includes all possible image processing filtering, such as deinterlacing filtering, deringing filtering, and deblocking filtering (e.g., in-loop H.264 deblocking filtering).

In various embodiments, video encoder 310 is capable of encoding MPEG-2 video streams, MPEG-4 video streams, H.264 video streams, or any other appropriate video streams. In some embodiments, video encoder 310 processing process is comprised of a different number of subunits or of a different partitioning of subunits of processing than as depicted in FIG. 3B. In some embodiments, the number of subunits and/or the partitioning of subunits of processing are selected to attempt to reduce the execution time of video encoder 310 by reducing the number of instruction cache misses—for example, if the video processing processes can be broken into subunits that can separately operate on data blocks and these subunits can fit in the instruction cache, then the number of cache misses may be reduced for both data cache misses and instruction cache misses. In some embodiments, the partitioning of subunits of processing is based on a design time choice and is not be adaptable to runtime variations that arise from different hardware configurations or performances.

Figure 4:
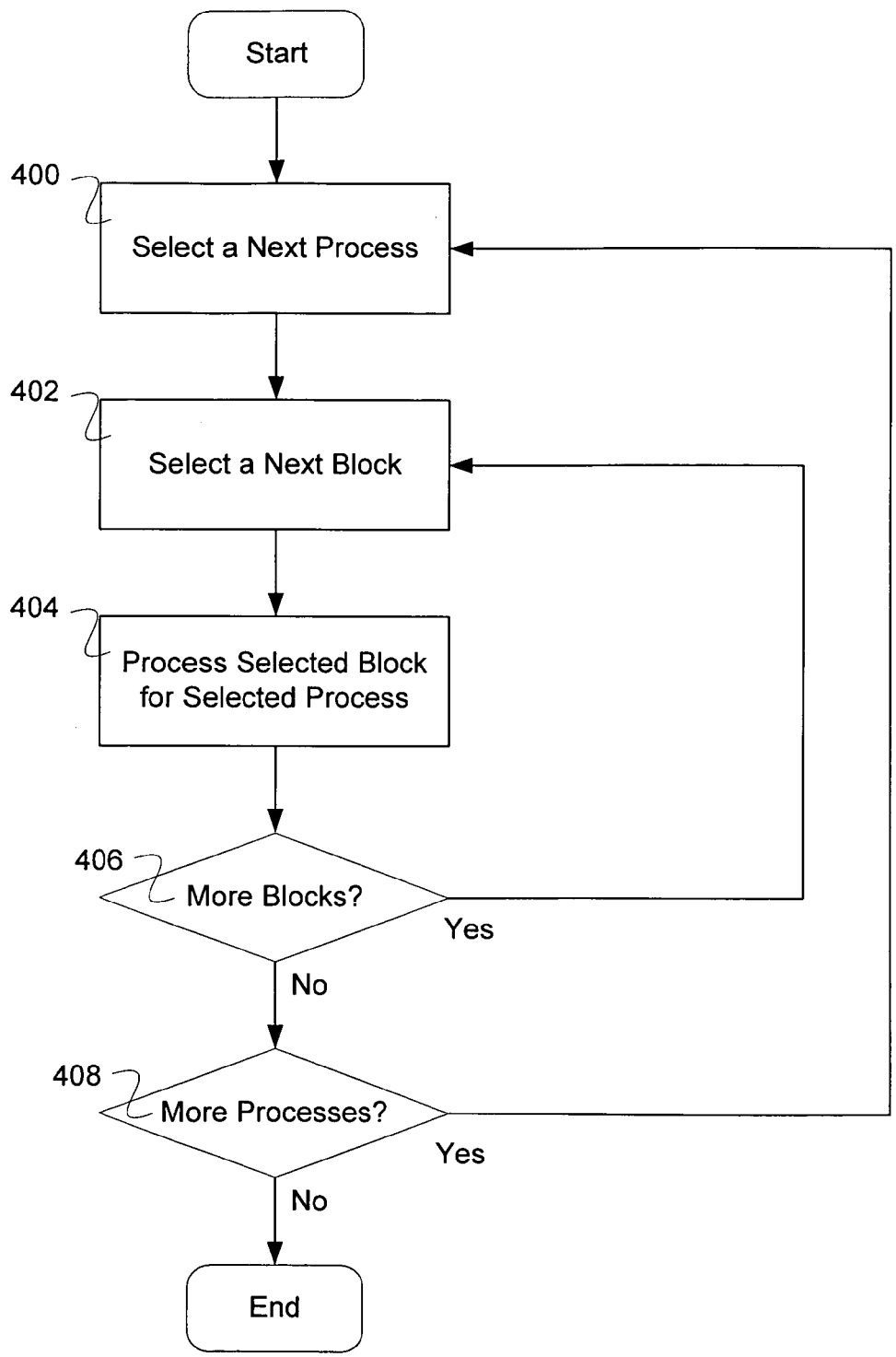
FIG. 4 is a flow diagram illustrating an embodiment of a process for video processing.

FIG. 4 is a flow diagram illustrating an embodiment of a process for video processing. In some embodiments, the process in FIG. 4 is executed by a program running on CPU 102 in device 100 of FIG. 1. In the example shown, in 400 a next process is selected. In 402, a next block is selected. In various embodiments, the block comprises a macroblock, a portion of a video data frame (e.g., a quarter or a half of the video frame), or any other appropriate block of data from the video data stream. In 404, the selected block is processed by the selected process. In 406, it is determined if there are more blocks to process. If there are more blocks to process, control is passed to 402. If there are not more blocks to process, if is determined in 408 if there are more processes. If there are more processes, then control passes to 400. If there are no more processes to complete processing, then the process ends. By processing each block for a given process, a cache miss will occur when the data blocks of a video data stream that are being processed exceed the cache size. Instructions cache misses will occur when the instructions for video data processing exceed the cache size. In the event that all the video data stream blocks fit in the cache and the instructions for processing do not fit in the cache, the process of FIG. 4 could be efficient for processing the video data stream.

Figure 5:
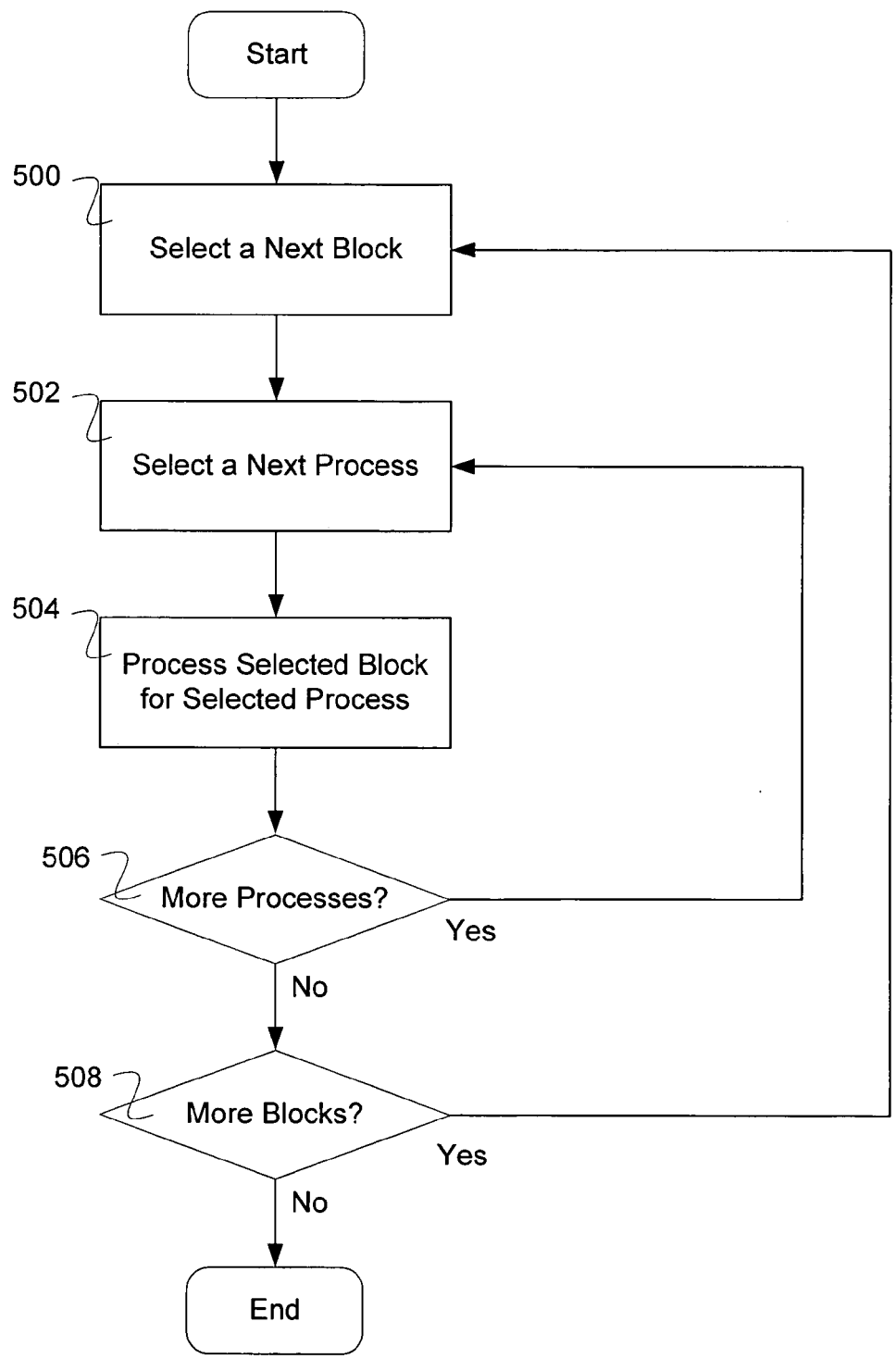
FIG. 5 is a flow diagram illustrating an embodiment of a process for video processing.

FIG. 5 is a flow diagram illustrating an embodiment of a process for video processing. In some embodiments, the process in FIG. 5 is executed by a program running on CPU 102 in device 100 of FIG. 1. In the example shown, in 500 a next block is selected. In various embodiments, the block comprises a macroblock, a portion of a video data frame, or any other appropriate block of data from the video data stream. In 502, a next process is selected. In 504, the selected block is processed by the selected process. In 506, it is determined if there are more processes. If there are more processes, then control passes to 502. If there are no more processes to complete processing, then it is determined in 508 if there are more blocks to process, control is passed to 500. If there are not more blocks to process, then the process ends. By processing a block for all processes, cache misses should not occur for data, since the data block is processed for different processes. However, instructions cache misses will occur when the instructions for video data processing exceed the cache size. In the event that the data cache can only process one block without having a data cache miss during processing, the process of FIG. 5 could be efficient for processing the video data stream.

Figure 6:
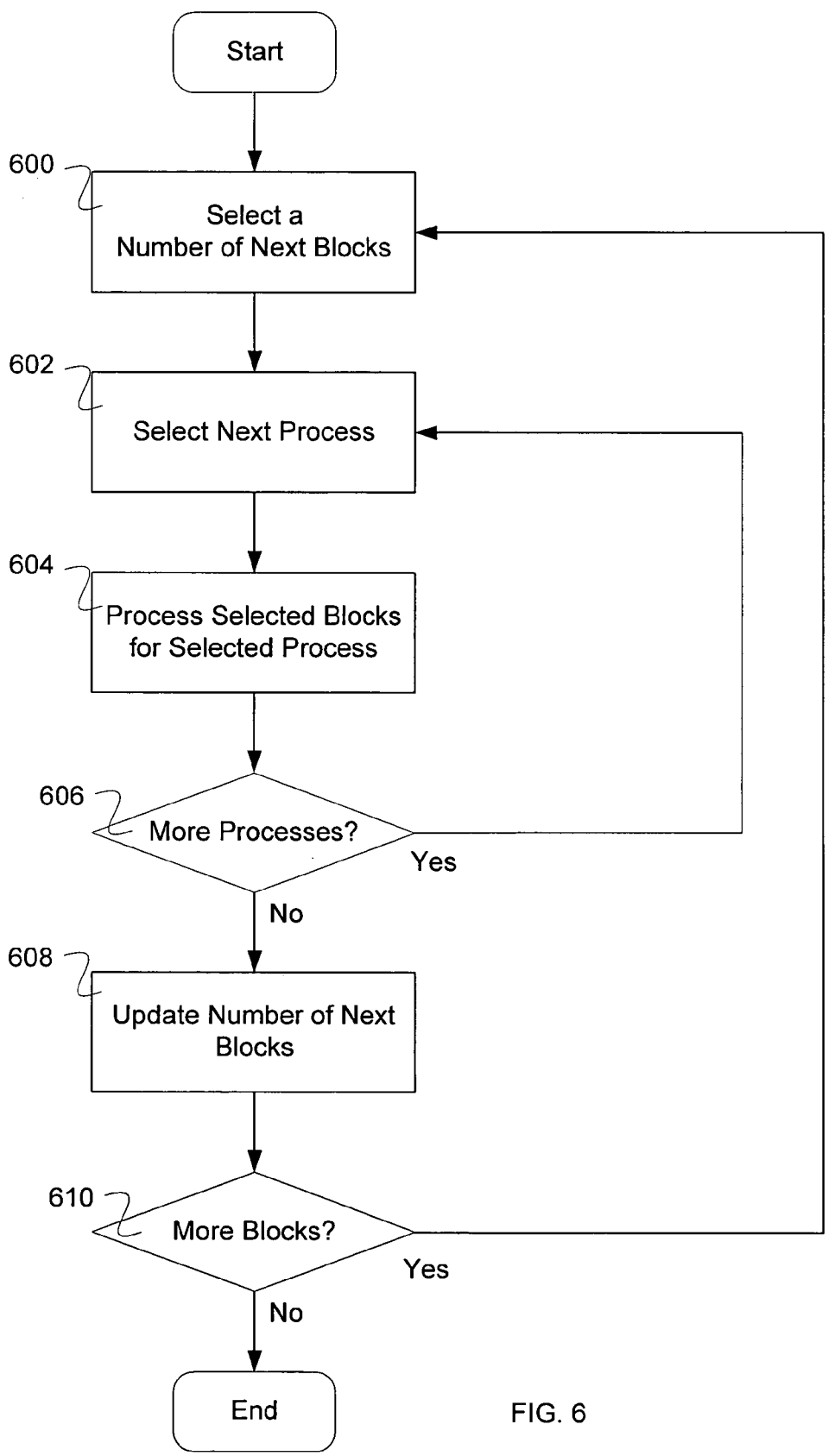
FIG. 6 is a flow diagram illustrating an embodiment of a process for video processing.

FIG. 6 is a flow diagram illustrating an embodiment of a process for video processing. In some embodiments, the process in FIG. 6 is executed by a program running on CPU 102 in device 100 of FIG. 1. In the example shown, in 600 a number of next blocks are selected. In various embodiments, the block comprises a macroblock, a portion of a video data frame, or any other appropriate block of data from the video data stream. In 602, a next process is selected. In 604, the number of blocks are processed by the selected process. In 606, it is determined if there are more processes. If there are more processes, then control passes to 602. If there are no more processes to complete processing, then in 608 the number of next blocks is updated. In 610, it is determined if there are more blocks to process. If there are more blocks to process, control is passed to 600. If there are not more blocks to process, then the process ends. By processing a number of blocks for all processes that all fit in the cache, cache misses should not occur for data, since the number of data blocks are processed for different processes. In 604, if the instruction size of selected process is smaller than the instruction cache size and if the process iterates over a number of blocks, then instruction cache misses should happen only at the first iteration thereby reducing instruction cache misses. Further by monitoring the processing performance metric, the number of blocks should be selected in such a way as to optimize the cache performance for the video processing. In the event that a number of blocks fit in the data cache and can be processed without a data cache miss, the process of FIG. 6 could be efficient for processing the video data stream. In the event that the number of blocks changes over time and the selection of the next number of blocks allows the number of blocks to remain optimal during the processing, the process of FIG. 6 could be efficient for processing the video data stream.

Figure 7:
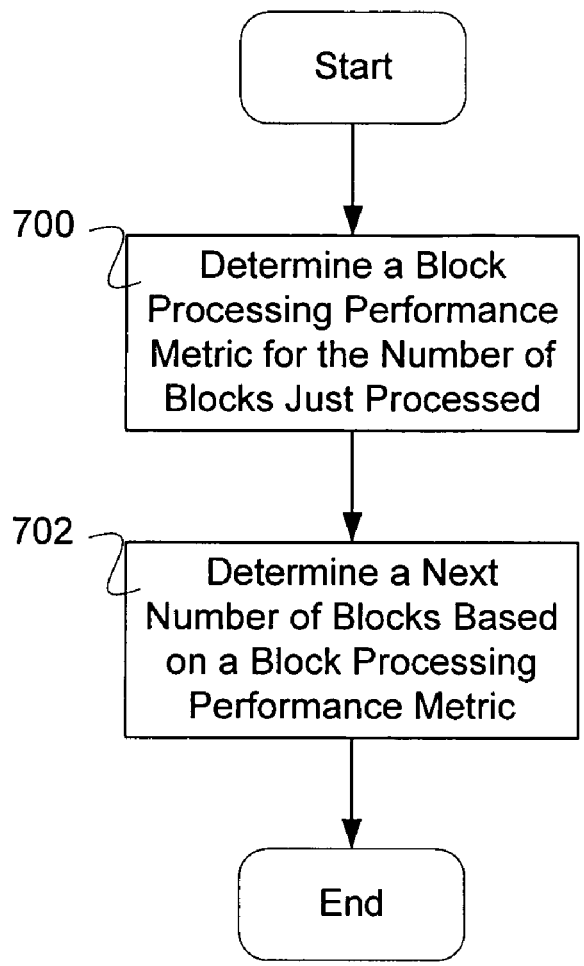
FIG. 7 is a flow diagram illustrating an embodiment of a process for updating the number of next blocks.

FIG. 7 is a flow diagram illustrating an embodiment of a process for updating the number of next blocks. In some embodiments, the process of FIG. 7 implements 608 of FIG. 6. In the example shown, in 700 a block processing performance metric for the number of blocks just processed. In various embodiments, the block comprises a macroblock, a portion of a video data frame, or any other appropriate block of data from the video data stream. In 702, a next number of blocks is determined based on a block processing performance metric. In some embodiments, the average time for processing a block is determined as the performance metric, and the number of blocks corresponding to the lowest average time for processing a block is selected for the next number of blocks for processing. In various embodiments, the processing performance metric is averaged over all time, over a period of time, not averaged, or any other appropriate weighting of the metric. In some embodiments, the processing performance metric is normalized for the number of blocks processed. In various embodiments, the processing performance metric comprises a number of clock cycles that occurred during the period it took to process the batch of blocks, or the time elapsed during the period it took to process the batch of blocks.

FIG. 8 illustrates a table of processing performance metric values in one embodiment. In some embodiments, the table in FIG. 8 is used to update the number of blocks in 608 of FIG. 6. In the example shown, the table has 2 columns: a number of blocks column and a processing performance metric value column. The number of blocks column has values 1, 2, 3, 4, 5, 6, . . . N corresponding to processing performance metric value column values value 1, value 2, value 3, value 4, value 5, value 6, . . . value N, respectively. In some embodiments, N is the largest number of blocks that can fit in the cache. In various embodiments, the block comprises a macroblock, a portion of a video data frame, or any other appropriate block of data from the video data stream. In various embodiments, the processing performance metric comprises the average time to process a block in the event that a number of blocks is processed as a batch, an average for a period of time (e.g., over a few seconds, a few frames, etc.) of the time to process a block, a weighted average for a period of time (e.g., heavily weighted for more recent times, but light weighting for more distant times) of the time to process a block, the most recent time to process a block, a number of clock cycles, or any other appropriate manner of representing the performance metric so that a decision regarding the number of samples used to determine the performance metric can be made.

Figure 9:
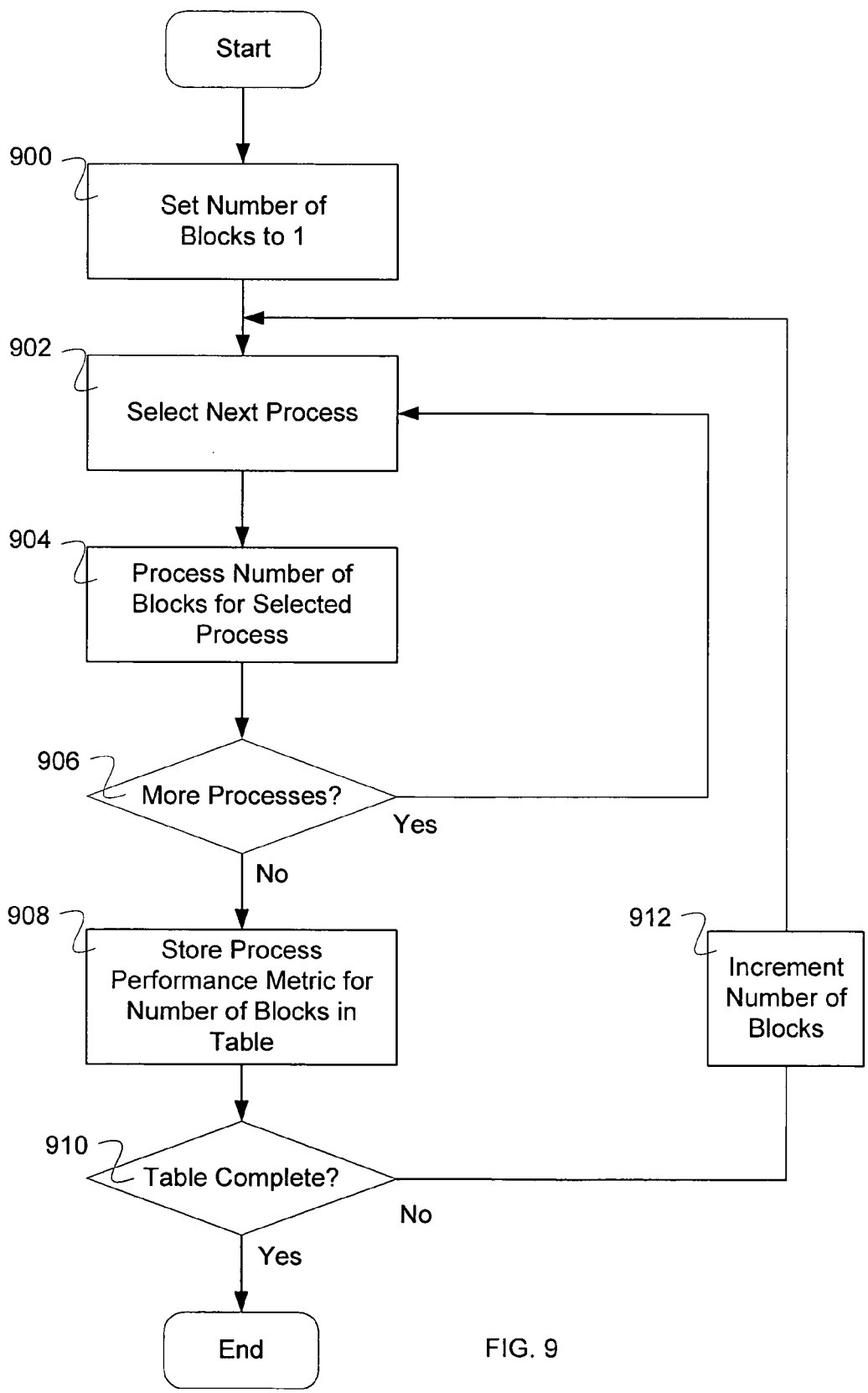
FIG. 9 is a flow diagram illustrating an embodiment of a process for initializing the tale of processing performance metric values.

FIG. 9 is a flow diagram illustrating an embodiment of a process for initializing the tale of processing performance metric values. In some embodiments, the process of FIG. 9 initializes the table in FIG. 8. In the example shown, in 900 the number of next blocks is set to 1. In 902, a next process is selected. In 904, the selected number of next blocks are processed by the selected process. In 906, it is determined if there are more processes. If there are more processes, then control passes to 902. If there are no more processes to complete processing, then in 908 the process performance metric for number of blocks is stored in the table. In 910, it is determined if the table is complete. If the table is not complete, then in 912 the number of blocks is incremented and control is passed to 902. If the table is complete, then the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for video processing optimization comprising:
   determining, using a processor, at runtime an optimal batch size based at least in part on a performance metric, wherein the optimal batch size comprises a number of blocks of video data to be processed as a batch, wherein the performance metric comprises a measure of video processing efficiency that was achieved for batches of video data that include different numbers of video data blocks, and wherein video processing comprises one of video encoding and video decoding; and
   video processing as a batch a group of blocks that includes the number of blocks of the optimal batch size.

2. The method as in claim 1, wherein determining at runtime includes processing a plurality of batches each of a different batch size and selecting as the optimal batch size of video data for video processing the batch size of the batch that achieved the best performance as determined based at least in part by the performance metric.

3. The method as in claim 1, wherein determining at runtime includes finding a lowest performance metric value in a table.

4. The method as in claim 1, further comprising measuring the performance metric.

5. The method as in claim 1, wherein the performance metric comprises one of the following: a number of processing clock cycles, a processing time, a processing time per block, an average processing time per block, a weighted average processing time per block, or an average processing time per block averaged over a period of time.

6. The method as in claim 1, wherein the blocks of video data comprise one of the following: a macroblock, or a portion of the video frame.

7. The method as in claim 1, wherein video processing the group of blocks as a batch comprises at least one of (1) executing the same set of instructions with respect to two or more blocks of video data and (2) executing two or more sets of instructions with respect to a block of video data.

8. The method as in claim 1, wherein video processing comprises one of the following: decoding the number of blocks, MPEG-2 decoding the number of blocks, MPEG-4 decoding the number of blocks, H.264 decoding the number of blocks, filtering the number of blocks, color converting the number of blocks, deinterlacing the number of blocks, deringing the number of blocks, deblocking the number of blocks, encoding the number of blocks, MPEG-2 encoding the number of blocks, MPEG-4 encoding the number of blocks, H.264 encoding the number of blocks, reconstructing a reference frame, and in-loop filtering the number of blocks.

9. A system for video processing optimization comprising:
   a processor; and
   a memory coupled with the processor, wherein the memory is configured to provide the processor with instructions which when executed cause the processor to:
   determine at runtime an optimal batch size based at least in part on a performance metric, wherein the optimal batch size comprises a number of blocks of video data to be processed as a batch, wherein the performance metric comprises a measure of video processing efficiency that was achieved for batches of video data that include different numbers of video data blocks, and wherein video processing comprises one of video encoding and video decoding; and
   video process as a batch a group of blocks that includes the number of blocks of the optimal batch size.

10. A computer program product for video processing optimization, the computer program product being embodied in a non-transitory computer readable medium and comprising computer instructions for:
   determining at runtime an optimal batch size based at least in part on a performance metric, wherein the optimal batch size comprises a number of blocks of video data to be processed for as a batch, wherein the performance metric comprises a measure of video processing efficiency that was achieved for batches of video data that include different numbers of video data blocks, and wherein video processing comprises one of video encoding and video decoding; and
   video processing as a batch a group of blocks that includes the number of blocks of the optimal batch size.

11. A method for video processing optimization comprising:
   selecting, using a processor, for video processing a first block of data comprising less than a frame of video data, wherein:
   the first block of data is transferred into a data cache;

video processing comprises a processing step, wherein
the processing step comprises an instruction, wherein
a size of the instruction is less than a size of an instruction cache, and wherein having the size of the instruction as less than the size of the instruction cache targets reducing instruction cache misses;

decoding the first block of data; and performing a post-decoding processing with respect to the decoded first block of data without first waiting to complete decoding of a second block comprising the frame of video data, wherein the first block of data undergoes the processing step and the post-decoding processing without being transferred out of the data cache.

12. A system for video processing optimization comprising:

a processor; and a memory coupled with the processor, wherein the memory is configured to provide the processor with instructions which when executed cause the processor to:

select for video processing a first block of data comprising less than a frame of video data, wherein:

the first block of data is transferred into a data cache;

video processing comprises a processing step, wherein the processing step comprises an instruction, wherein a size of the instruction is less than a size of an instruction cache, and wherein having the size of the instruction as less than the size of the instruction cache targets reducing instruction cache misses;

decode the first block of data; and perform a post-decoding processing with respect to the decoded first block of data without first waiting to complete decoding of a second block comprising the frame of video data, wherein the first block of data undergoes the processing step and the post-decoding processing without being transferred out of the data cache.

13. The system as in claim 9, wherein determine at runtime includes process a plurality of batches each of a different batch size and select as the number of blocks of video data to be processed for video processing as a batch the batch size of the batch that achieved the best performance as determined based at least in part by the performance metric.

14. The system as in claim 9, wherein determine at runtime includes finding a lowest performance metric value in a table.

15. The system as in claim 9, further comprising instructions which when executed cause the processor to measure the performance metric.

16. The system as in claim 9, wherein the performance metric comprises one of the following: a number of processing clock cycles, a processing time, a processing time per block, an average processing time per block, a weighted average processing time per block, or an average processing time per block averaged over a period of time.

17. The system as in claim 9, wherein the blocks of video data comprise one of the following: a macroblock, or a portion of the video frame.

18. The system as in claim 9, wherein video process the group of blocks as a batch comprises at least one of (1) execute the same set of instructions with respect to two or more blocks of video data and (2) execute two or more sets of instructions with respect to a block of video data.

19. The system as in claim 9, wherein video processing comprises one of the following: decoding the number of blocks, MPEG-2 decoding the number of blocks, MPEG-4 decoding the number of blocks, H.264 decoding the number of blocks, filtering the number of blocks, color converting the number of blocks, deinterlacing the number of blocks, deringing the number of blocks, deblocking the number of blocks, encoding the number of blocks, MPEG-2 encoding the number of blocks, MPEG-4 encoding the number of blocks, H.264 encoding the number of blocks, reconstructing a reference frame, and in-loop filtering the number of blocks.

* * * * *